(12) United States Patent
Singh et al.

(10) Patent No.: US 9,072,026 B1
(45) Date of Patent: Jun. 30, 2015

(54) SYSTEMS AND METHODS FOR ENFORCING VENDOR-BASED RESTRICTIONS ON WIRELESS SERVICE

(75) Inventors: Jasinder P. Singh, Olathe, KS (US); Sachin R. Vargantwar, Macon, GA (US); Maulik K. Shah, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 370 days.

(21) Appl. No.: 13/605,683

(22) Filed: Sep. 6, 2012

(51) Int. Cl.
*H04M 1/66* (2006.01)
*H04W 4/00* (2009.01)
*H04W 24/00* (2009.01)
*H04W 48/02* (2009.01)
*H04W 84/10* (2009.01)
*H04W 12/08* (2009.01)
*H04W 64/00* (2009.01)
*H04W 84/04* (2009.01)
*H04W 88/08* (2009.01)

(52) U.S. Cl.
CPC ............ *H04W 48/02* (2013.01); *H04W 84/105* (2013.01); *H04W 12/08* (2013.01); *H04W 64/003* (2013.01); *H04W 84/045* (2013.01); *H04W 88/08* (2013.01)

(58) Field of Classification Search
USPC ................ 455/410–411, 435.1, 414.1–414.3, 455/432.1–432.3, 456.1–457; 726/3, 22; 713/168
See application file for complete search history.

(56) References Cited

U.S. PATENT DOCUMENTS

| | | | |
|---|---|---|---|
| 6,038,455 A | 3/2000 | Gardner et al. | |
| 6,253,088 B1 * | 6/2001 | Wenk et al. | 455/462 |
| 8,041,819 B1 | 10/2011 | Bhalla et al. | |
| 2004/0049699 A1 * | 3/2004 | Griffith et al. | 713/201 |
| 2004/0259570 A1 * | 12/2004 | Wan et al. | 455/456.1 |
| 2005/0097356 A1 | 5/2005 | Zilliacus et al. | 713/201 |
| 2007/0037577 A1 * | 2/2007 | Dalsgaard et al. | 455/436 |
| 2007/0076696 A1 * | 4/2007 | An et al. | 370/352 |
| 2007/0256135 A1 * | 11/2007 | Doradla et al. | 726/26 |
| 2008/0085699 A1 * | 4/2008 | Hirano et al. | 455/414.2 |
| 2010/0041372 A1 * | 2/2010 | Linkola et al. | 455/411 |
| 2010/0214956 A1 * | 8/2010 | Law et al. | 370/255 |
| 2012/0030110 A1 * | 2/2012 | Prakash et al. | 705/44 |
| 2012/0116886 A1 * | 5/2012 | Manku | 705/14.64 |

* cited by examiner

Primary Examiner — Michael Mapa (57) ABSTRACT

Disclosed herein are systems and methods for enforcing vendor-based restrictions on wireless service. One embodiment takes the form of a method that is carried out by at least one radio access network (RAN) entity and that includes receiving an access request from a mobile station via a base station, and responsively making a vendor identification to identify a vendor of the base station. The method further includes denying the access request based at least in part on the vendor identification.

24 Claims, 6 Drawing Sheets

| Vendor Name | Vendor ID | Vendor Location | Base-Station Serial Numbers | Base-Station MAC Addresses | Base-Station IP Addresses |
|---|---|---|---|---|---|
| vendor_x | vendor_x_id | vendor_x_loc | vendor_x_ser_# | vendor_x_MAC_addr<br>(##:##:##:##:##:##)<br>(##:##:##:##:##:XX)<br>(MAC_X through MAC_Y) | vendor_x_IP_addr<br>(#.#.#.#)<br>(aaa.bbb.ccc.d**)<br>(#.#.#.# through #.#.#.#) |
| vendor_y | . . . | . . . | . . . | . . . | . . . |
| . . . | . . . | . . . | . . . | . . . | . . . |

Vendor Profile Record

| | | |
|---|---|---|
| Name | = | vendor_a |
| ID | = | vendor_a_id |
| HQ Location | = | location_A |
| Facility Location | = | location_A1<br>location_A2<br>location_A3 |
| Base-Station Serial Numbers | = | vendor_a_ser_# |
| Base-Station MAC Addresses | = | vendor_a_<br>MAC_addr |
| Base-Station IP Addresses | = | vendor_a_<br>IP_addr |
| . . . | | |

SYSTEMS AND METHODS FOR ENFORCING VENDOR-BASED RESTRICTIONS ON WIRELESS SERVICE

BACKGROUND

The use of cellular phones and other types of mobile stations is becoming increasingly prevalent and popular in modern life. To provide cellular wireless communication service to such mobile stations (also often referred to as wireless communication devices, client devices, user equipment, subscriber devices, access terminals, and the like), a wireless service provider typically operates a radio access network (RAN) that defines coverage areas (such as cells and/or sectors) in which subscribers' mobile stations can be served by the RAN and obtain connectivity to other networks such as the public switched telephone network (PSTN) and the Internet.

A typical RAN includes one or more base transceiver stations (BTSs), each of which may radiate to define one or more coverage areas in which these mobile stations can operate. Further, the RAN may include one or more base station controllers (BSCs) or the like, which may be integrated with or otherwise in communication with the BTSs, and which may include or be in communication with one or more switches and/or gateways that provide connectivity with one or more transport networks. Conveniently, with this arrangement, a mobile station positioned within the coverage of the RAN can communicate with a BTS and in turn with other served devices and/or with other entities via the one or more transport networks.

In each coverage area, a RAN will typically broadcast (via, e.g., a BTS) a pilot signal that notifies mobile stations of the coverage area. In operation, when a mobile station detects a pilot signal of sufficient strength, it may transmit a registration message to the RAN to notify the RAN that the mobile station is in the coverage area and is requesting service from the RAN via the BTS. If the request is granted, the mobile station may then operate in the coverage area in what is typically known as "idle" mode, where the mobile station is not actively engaged in a call or other traffic (e.g., packet-data) communication, but does regularly monitor overhead signals in the coverage area to obtain system information and page messages, as examples.

Overview

Not all requests for service, be they registration requests, call-origination messages, and/or some other type of message(s), are granted, however. Indeed, one or more network-side entities may determine for any number of reasons that a given request for service (i.e., an access request) should be denied. In such cases, the RAN may transmit via the BTS to the requesting mobile station a message that indicates that the request has been denied. A few typical reasons for issuing such messages are lack of capacity and failure to authorize the mobile station. In accordance with the present disclosure, a RAN may deny an access request received from a mobile station via a base station after making, and indeed on the basis of, a vendor identification that identifies the vendor (e.g., a manufacturer, a supplier, or the like) of the base station.

As such, presently disclosed are systems and methods for managing signaling traffic in a wireless coverage area in response to varying congestion. One embodiment takes the form of a method carried out by at least one RAN entity, where the at least one RAN entity comprises at least one communication interface, at least one processor, and data storage containing program instructions executable by the at least one processor for carrying out the method, which includes receiving an access request from a given mobile station via a given base station and responsively making a vendor identification to identify a vendor of the given base station. The method also includes denying the access request based at least in part on the vendor identification. Another embodiment takes the form of a RAN that includes at least one wireless-communication interface, at least one processor, and data storage containing program instructions executable by the at least one processor for carrying out the just-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various example embodiments are described herein with reference to the following drawings, in which like numerals denote like entities, and in which.

DETAILED DESCRIPTION OF THE DRAWINGS

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
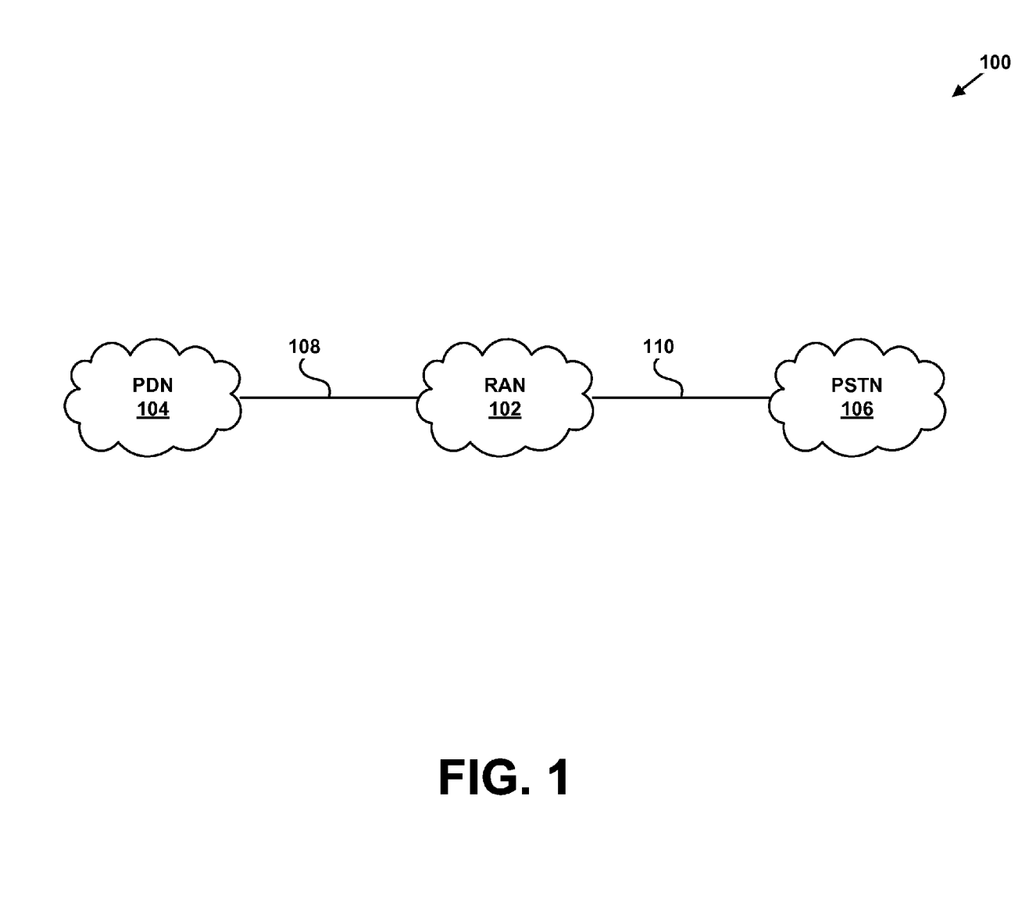
FIG. 1 is a simplified diagram depicting an example communication system.

Referring to the drawings, FIG. 1 depicts a communication system 100 that includes a RAN 102, a packet-data network (PDN) 104, and a PSTN 106. RAN 102 communicates with PDN 104 via a communication link 108, and with PSTN 106 via a communication link 110; either or both of these links may include one or more wired and/or wireless interfaces.

B. Example RAN

Figure 2:
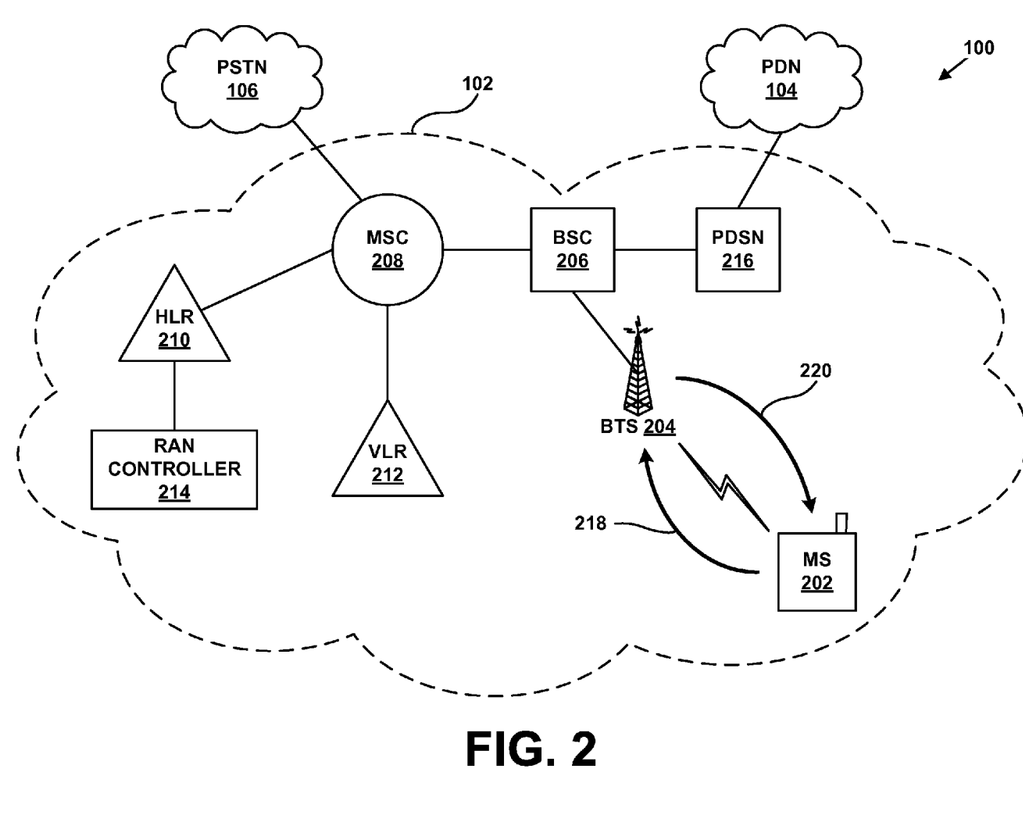
FIG. 2 is a simplified diagram depicting an example radio access network (RAN) in the context of the example communication system of FIG. 1.

FIG. 2 depicts communication system 100 with a more detailed depiction of RAN 102, which is shown in this example as including a mobile station 202, a BTS 204, a BSC 206, a mobile switching center (MSC) 208, a home location register (HLR) 210, a visitor location register (VLR) 212, a RAN controller 214, and a packet data serving node (PDSN) 216. Additional entities could also be present. For example, there could be additional mobile stations in communication with BTS 204. As another example, there could be additional entities in communication with PDN 104 and/or PSTN 106. Also, there could be one or more routers, switches, and/or other devices or networks making up at least part of one or more of the communication links. And other variations are possible as well.

Mobile station 202 may be any device arranged to carry out the mobile station functions described herein. As such, mobile station 202 may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for code division multiple access (CDMA) communication. The chipset or wireless-communication interface in general may also or instead be arranged to communicate according to one or more other types (e.g. protocols) mentioned herein and/or any others now known or later developed. The processor and data storage may be any suitable components known to those of skill in the art. As examples, mobile stations 202 could be or include a cell phone or a smartphone.

BTS 204 may be any network element arranged to carry out the BTS functions described herein. As such, BTS 204 may include a communication interface, a processor, and data storage comprising instructions executable by the processor to carry out those BTS functions. The communication interface may include one or more antennas, chipsets, and/or other components for providing one or more coverage areas such as cells and sectors, for communicating with mobile stations 202 over an air interface. The communication interface may be arranged to communicate according to one or more protocols mentioned herein and/or any others now known or later developed. The communication interface may also include one or more wired and/or wireless interfaces for communicating with at least BSC 206.

BSC 206 may be any network element arranged to carry out the BSC functions described herein. As such, BSC 206 may include a communication interface, a processor, and data storage comprising instructions executable by the processor to carry out those BSC functions. The communication interface may include one or more wired and/or wireless interfaces for communicating with at least BTS 204, MSC 208, and PDSN 216. In general, BSC 206 functions to control one or more BTSs such as BTS 204, and to provide one or more BTSs such as BTS 204 with connections to devices such as MSC 208 and PDSN 216. Note that, as used herein, "base station" may mean a BTS, or perhaps a combination of a BTS and BSC. In general, RAN 102 could include any number of BTSs communicating with any number of BSCs.

MSC 208 may be any networking element arranged to carry out the MSC functions described herein. As such, MSC 208 may include a communication interface, a processor, and data storage comprising instructions executable by the processor to carry out those MSC functions. The communication interface may include one or more wired and/or wireless interfaces for communicating with at least BSC 206, HLR 210, VLR 212, and PSTN 106. In general, MSC 208 functions as a switching element between PSTN 106 and one or more BSCs such as BSC 206, facilitating communication between mobile stations and PSTN 106. When a given mobile station 202 enters into a coverage area of RAN 102, the MSC 208 may detect the given mobile station 202 and responsively update HLR 210 with the location of the given mobile station 202, and would typically also create a new record in VLR 212 for the mobile station.

HLR 210 may serve standard functions in the wireless network such as managing service profiles and authentication information for mobile stations, and may be operated by a home service provider for a given mobile station. VLR 212 may store service profile information for mobile stations currently being served by a RAN 102. Additionally, HLR 210 and VLR 212 may include one or more wired and/or wireless communication interfaces.

In typical operation, BTS 204 may receive an access request 218 from mobile station 202 and responsively relay the access request 218 to one or more of BSC 206, RAN controller 214, or one or more other RAN entities. The access request 218 may include a request to register with the RAN 102 and/or a call-origination message, among other possibilities. Furthermore, the access request 218 may include identifying data of the BTS 204. After receiving the access request 218 from the mobile station 202, one or more RAN entities may deny the access request 218 and send an access-request-denying message 220 to the given mobile station 202. The access-request-denying message may include additional information, such as identifying data of the BTS 204, which can optionally be stored locally by the given mobile station 202.

C. Example RAN Entity

Figure 3:
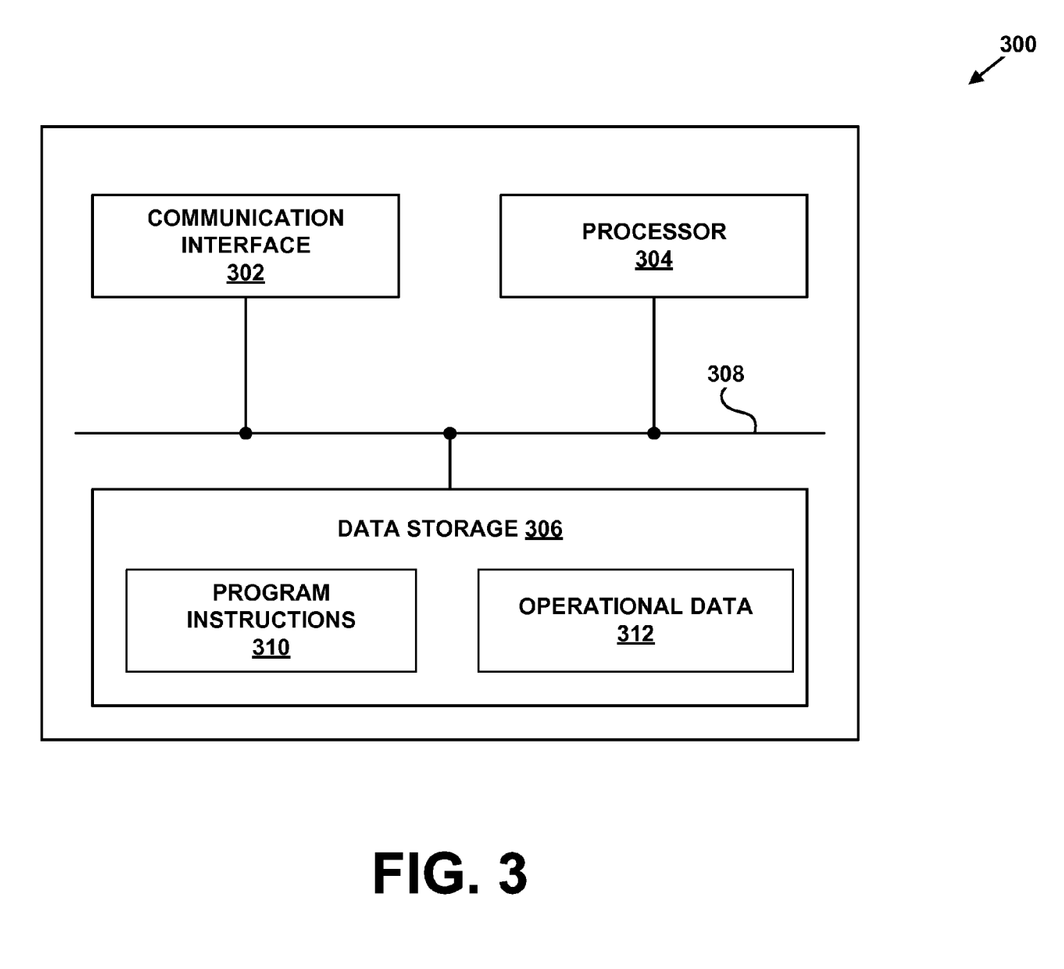
FIG. 3 is a simplified diagram of a representative RAN entity illustrating some of the components that can be included in such an entity.

FIG. 3 is a simplified block diagram of a representative RAN entity 300, such as a mobile station, MSC, or BSC, as but a few examples, though any client or network-side communication entity described herein may have a structure similar to that described with respect to representative RAN entity 300. As shown, entity 300 may include a communication interface 302, a processor 304, and data storage 306, all of which may be coupled together by a system bus, network, or other connection mechanism 308.

Communication interface 302 may comprise an antenna arrangement (not shown) and/or associated components such as a modem, for instance, to facilitate wireless and/or wired data communication with one or more other entities. Processor 304 may comprise one or more general-purpose and/or one or more special-purpose processors, and may be integrated in whole or in part with wireless-communication interface 302. Data storage 306 may comprise one or more volatile and/or non-volatile storage components (such as magnetic, optical, flash, or other non-transitory storage) and may be integrated in whole or in part with processor 304. As shown, data storage 306 may hold program instructions 310 that are executable by processor 304 to carry out various functions. Additionally, data storage 306 may hold operational data 312 which comprises information that is collected and stored as a result of the functions carried out by executed program instructions 310. And other configurations are possible as well.

III. Example Operation

Figure 4:
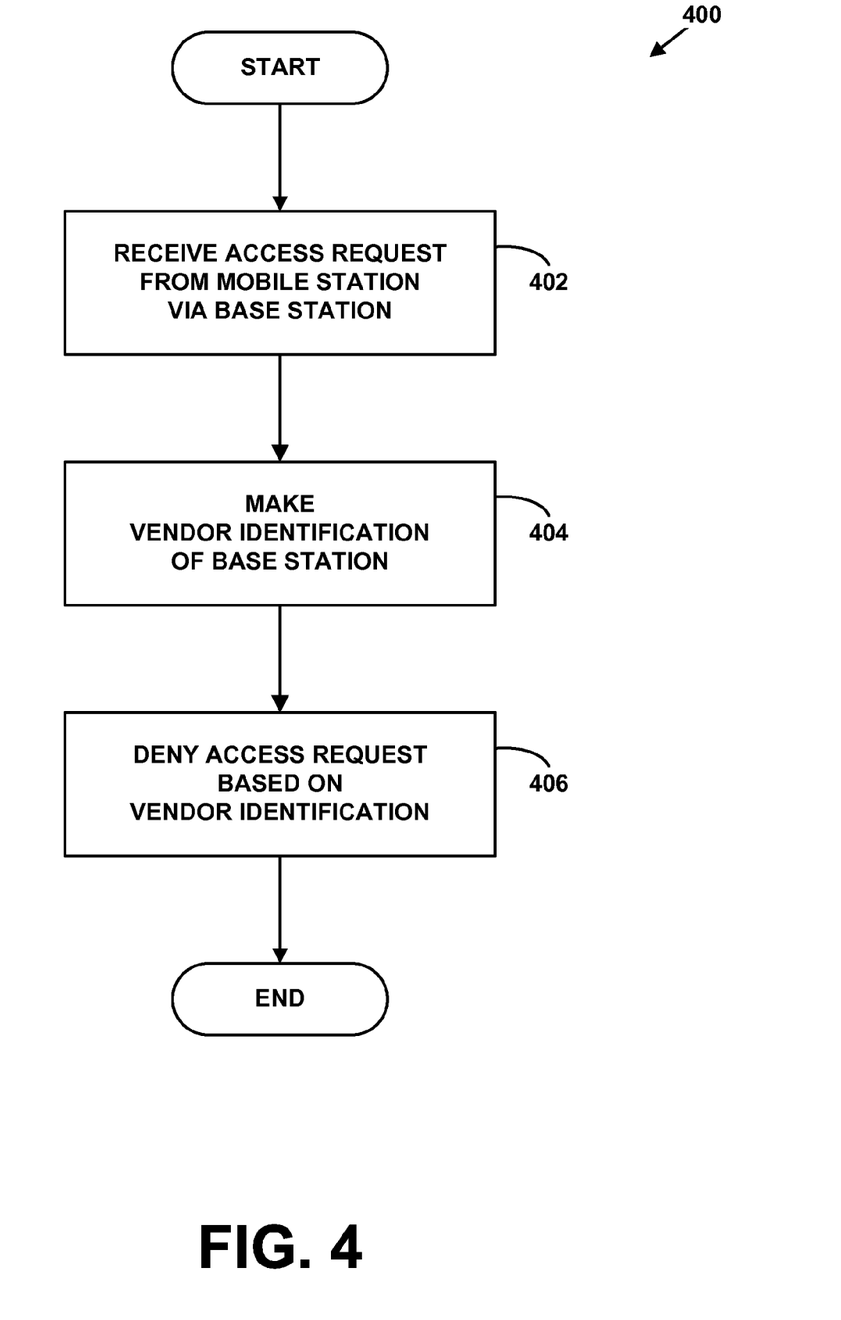
FIG. 4 is flowchart depicting functions that are carried out in accordance with at least one embodiment.

FIG. 4 is flowchart depicting functions that are carried out in accordance with at least one embodiment. In particular, FIG. 4 depicts a method 400 that may be carried out by at least one RAN entity such as BSC 206, MSC 208, HLR 210, VLR 212, RAN controller 214, and/or PDSN 216. In general, the method 400 could be carried out by any one or any combination of the RAN entities described by way of example in this description and/or any other RAN entity or entities deemed suitable in a given implementation. In the description below, method 400 is described as being carried out by RAN controller 214, though this is purely by way of example and not meant to be by way of limitation. Furthermore, it should be understood by those with ordinary skill in the art that the systems and methods described herein can be implemented in networks that operate according to different network protocols (such as CDMA, Evolution Data Optimized (EV-DO), Long Term Evolution (LTE), and the like).

Method 400 begins at step 402, where RAN controller 214 receives an access request 218 from mobile station 202 via BTS 204, where the air-interface portion of this communication is depicted in FIG. 2. Using the architecture described above as an example, the access request 218 would pass from BTS 204 through BSC 206, MSC 208, and HLR 210 before being received by RAN controller 214. In various embodiments, access request 218 may be or include a registration request, a call-origination message, and/or one or more other types of access request deemed suitable for a given implementation.

At step 404, in response to receiving access request 218, RAN controller 214 makes a vendor identification to identify a vendor of the base station via which access request 218 was received from mobile station 202. In this example, that base station is BTS 204, though in other examples it could be BTS 204 together with BSC 206, or perhaps some other possibility.

Furthermore, the carrying out of step 404 could take various different forms in various different embodiments. As one example, making the vendor identification of BTS 204 could involve ascertaining identifying data of BTS 204. This identifying data could be or include one or more hardware identifiers (such as a serial number, a media access control (MAC) address, and the like) of BTS 204. In some embodiments, the identifying data of BTS 204 could be or include one or more characteristics such as a network (e.g., IP) address of BTS 204, an identification number corresponding to the vendor of BTS 204, a name of the vendor, and/or one or more other characteristics of a given base station.

And it should be noted that some data (such as vendor identification number, vendor name, and the like) that is characterized in this description as being identifying data of a base station may in fact more directly identify the vendor of the given base station rather than uniquely identifying the base station itself. That is, the ascertaining of identifying data of a base station may directly identify the vendor itself, or may be more of an intermediate step that obtains data that can then be used to identify the vendor of the given base station. Further to that point, making the vendor identification of the given base station may further involve referencing (local and/or remote) correlation data to map the ascertained identifying data of the given base station to an identification of the vendor. As to how RAN controller 214 ascertains the identifying data of BTS 204, among other possibilities, that identifying data could have been inserted into access request 218 by mobile station 202, by BTS 204, and/or by one or more other entities in the communication path between mobile station 202 and RAN controller 214.

At step 406, RAN controller 214 denies access request 218 based at least in part on the vendor identification. In at least one embodiment, the carrying out of this step involves RAN controller 214 sending to mobile station 202 an access-request-denying message 220, where the air-interface portion of that communication is depicted in FIG. 2.

In at least one embodiment, RAN controller 214 ascertains vendor-characteristic data that represents one or more characteristics of the vendor, and furthermore the denying of access request 218 is done based at least in part on one or more of the characteristics of the vendor that are represented by the vendor-characteristic data. In particular, in various embodiments, RAN controller 214 may deny access request 218 based at least in part on one or more of the following represented characteristics of the vendor: location of the headquarters of the vendor, location of one or more facilities of the vendor, place of incorporation of the vendor, membership (or lack of membership) of the vendor in a particular association, membership (or lack of membership) of a government associated with a vendor location (headquarters, one or more manufacturing facilities, etc.) in a given organization, and/or one or more other vendor characteristics deemed suitable for use as criteria in a given implementation.

Once RAN controller 214 has made a determination to deny a given access request due to the vendor identification made in response to receiving that access request, RAN controller 214 may take one or more additional steps, one example being that RAN controller 214 may add the identified vendor to a blacklist of vendors maintained by or at least accessible to RAN controller 214. In a similar vein, if a vendor identification does not result in the denial of a given access request, RAN controller 214 may add that particular vendor to a whitelist of vendors maintained or at least accessible to RAN controller 214.

Indeed, as part of its general, iterative operation, upon receiving an access request and identifying the vendor of the base station via which the access request was received, RAN controller 214 may initially check a whitelist and/or a blacklist to determine whether a quick grant/deny decision could be made, and then proceeding as described above only in cases where such a decision could not be substantially immediately made. In some embodiments, RAN controller 214 may be arranged to deny access requests when the respective identified vendor is not listed in such a whitelist. In other embodiments, RAN controller 214 may be arranged to deny access requests when the respective identified vendor is listed in such a blacklist. And certainly the sequence of checking such lists and the degree of importance attributed to vendors being found or not found on one or more such lists can vary as appropriate for a given situation.

In various embodiments, RAN controller 214 may maintain whitelists of vendors, blacklists of vendors, or simply lists of vendors in a multitude of different formats. One such example format is show in FIG. 5, which depicts by way of example a data table 500 having organized information pertaining to a number of different base-station vendors. The depiction in FIG. 5 is in tabular form, where each row pertains to a given vendor, and where each column pertains to a given characteristic of the given vendor.

Figure 5:
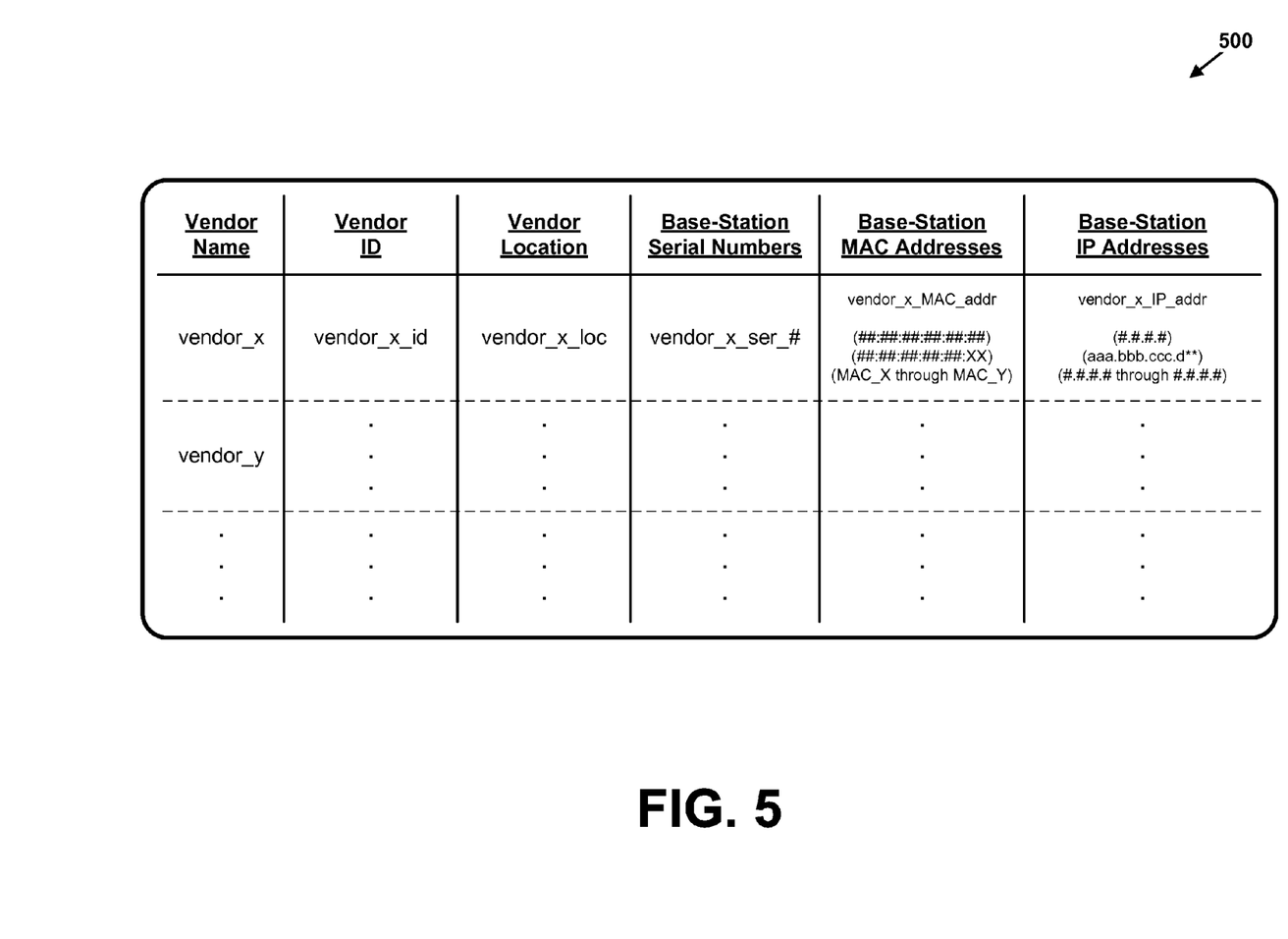
FIG. 5 is a simplified diagram depicting an example of a vendor-related-data table that may be maintained in accordance with at least one embodiment.

The example base-station-vendor characteristics depicted in FIG. 5 are Vendor Name, Vendor ID, Vendor Location, Base-Station Serial Numbers, Base-Station MAC Addresses, and Base-Station IP Addresses. It should be understood, of course, that the depicted manner of organization and the depicted vendor characteristics are provided herein by way of example only and not by way of limitation, as certainly other manners of organization and other sets of vendor characteristics could be deemed by one of skill in the art to be suitable for a given implementation, as one or more of these example columns could be removed in one or more embodiments, and one or more additional columns could be used in one or more embodiments.

Returning to the description of the example represented by data table 500, the Vendor Name column may contain entries that simply list a given vendor by name, such as by an alphanumeric string of characters. The Vendor ID column may contain any one or more data values that—alone or together—uniquely identify one base-station vendor from another. The Vendor Location column may characterize one or more locations (e.g., headquarters, manufacturing facilities, distribution facilities, and the like) of the vendor according to any suitable manner of expressing location, such as but not limited to latitude and longitude, city, state, zip code, country, street address, and/or any other data fields usable to represent location.

The Base-Station Serial Numbers column may (in a given cell) contain one or more hardware serial numbers known to correspond with the base-station vendor that corresponds to that particular row of the table. Instead or in addition, such a cell may contain one or more "data masks" or the like, indicating for instance that any base-station serial number having a certain combination of certain characters in certain character positions in the serial number is a base-station serial number that is associated with a base station that was manufactured and/or otherwise provided by the vendor corresponding to that row of the table. And certainly other manners of representing serial numbers, such as beginnings and endings of one or more ranges of base-station serial numbers, could be used in various different implementations.

Similar to the Base-Station Serial Numbers column, the Base-Station MAC Addresses column may (in a given cell) contain one or more MAC addresses known to correspond with the base-station vendor that corresponds to that particular row of the table. Instead or in addition, such a cell may contain one or more "data masks" or the like, indicating for instance that any MAC address that ends in ":XX" as shown in the example of FIG. 5 was manufactured and/or otherwise provided by the vendor corresponding to that row, which in this example is the arbitrarily chosen vendor name of "vendor_x." And certainly other manners of representing MAC addresses, such as beginnings and endings of one or more ranges of MAC addresses, could be used in various different implementations.

Similarly, the Base-Station IP Addresses column may (in a given cell) contain one or more IP addresses known to correspond with the base-station vendor that corresponds to that particular row of the table. Instead or in addition, such a cell may contain one or more ranges of IP addresses known to be assigned to base stations provided by the corresponding vendor. Furthermore, one or more data masks could be used to represent IP addresses known to be associated with the corresponding vendor. And certainly other manners of representing IP addresses and/or ranges of IP addresses, be they IPv4 addresses, IPv6 addresses, or some other type of IP addresses, could be used instead or in addition.

The data in data table 500 may be stored in various forms. For example, identifiers such as vendor ID numbers and/or MAC addresses may be stored as values comprising one or more strings of characters including numbers, letters, and/or symbols. Further, as described, a range of values may be stored for a particular vendor identifier, such as a range of IP addresses. The data table 500 may contain actual values and/or pointers to storage locations of actual values.

Figure 6:
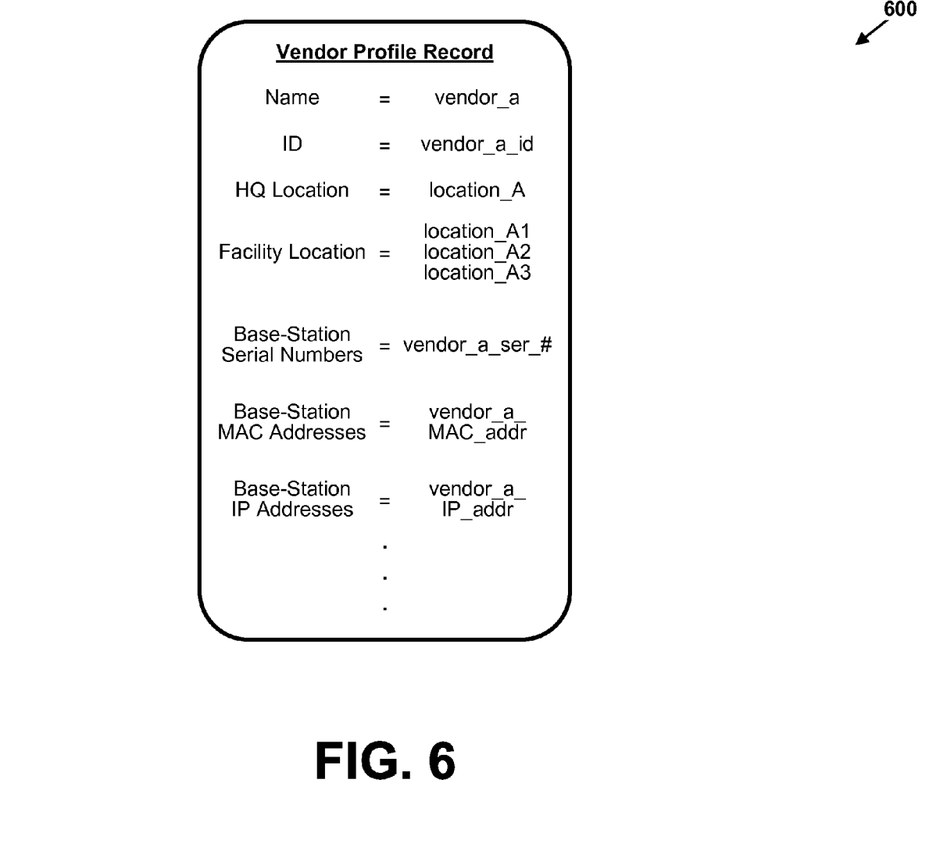
FIG. 6 is a simplified diagram depicting an example vendor-characteristic data profile that may be utilized in accordance with at least one embodiment.

In instances where RAN controller 214 deems it necessary or at least desirable to obtain further information regarding a particular base-station vendor, RAN controller 214 may use some or all of the identifying data discussed above pertaining to the base station to query a local or remote database that might, for instance, be organized in a manner similar to that described above with respect to the data table 500 of FIG. 5. In return, RAN controller 214 may receive a vendor profile record that could be similar to the example vendor profile record 600 that is shown in FIG. 6. As can be seen in FIG. 6, the example vendor profile record 600 contains a number of data fields and a number of example data values corresponding to those data fields.

As shown in FIG. 6, the data fields include Name (set to "vendor_a"), ID (set to "vendor_a_id"), HQ Location (set to "location_A"), Facility Location (set to "{location_A1, location_A2, location_A3}"), Base-Station Serial Numbers (set to "vendor_a_ser_#"), Base-Station MAC Addresses (set to vendor_a_MAC_addr), and Base-Station IP Addresses (set to "vendor_a_IP_addr"). In each case, the terse text used in FIG. 6 to represent a given data value corresponding to a given data field (such as vendor_a_ser_# corresponding to Base-Station Serial Numbers) could represent one or more values, one or more data masks, and/or one or more ranges of values, consistent with the description above.

As one example, in operation, RAN controller 214 may receive an access request from mobile station 202 via BTS 204, and that access request may contain an indication that the MAC address of BTS 204 is equal to "vendor_a_MAC_addr". RAN controller 214 may then query a local or remote database using that MAC address, and may receive vendor profile record 600 in return. RAN controller 214 may then store some or all of the data contained in vendor profile record 600 in row of a data table similar to the data table 500 of FIG. 5. RAN controller 214 may also apply certain logic to some or all of the data contained in vendor profile record 600 and now stored in data table 500. For instance, RAN controller 214 may determine that one of the locations (such as "location_A2," for example) that is associated with that base-station vendor is or is within a location predetermined by the logic to indicate the denial of access requests. RAN controller 214 may accordingly then transmit a denial of the access request to mobile station 202.

In some cases, vendor profile record 600 may contain a list of MAC addresses, a data mask, a MAC-address range, and/or one or more other ways of representing multiple MAC addresses. In such cases, if RAN controller 214 later receives access requests containing base-station MAC addresses that match an entry in such a list, that match such a data mask, that are contained within such a MAC-address range, and/or that otherwise match an alternate manner that has been used to represent multiple MAC addresses, RAN controller 214 may simply refer to data table 500, identify the same location, and accordingly also deny that request. Such an approach could also be used with respect to any or all of the fields maintained in a table such as data table 500. Naturally, other logic could be used as well, such as flagging a vendor as associated with denying access requests, as one example. Furthermore, such logic (e.g., criteria for denying access requests) and/or such vendor-related data could be updated as often as is seen fit for a given implementation.

In some embodiments, the base station at issue (such as BTS 204) may be shared between multiple wireless-service providers, such as between the wireless-service provider that operates RAN 102 and one or more other wireless-service providers. Furthermore, in some embodiments, the base station at issue may be arranged to operate on a given frequency in a given geographical area, and a given mobile station (such as mobile station 202) may respond to a receiving base-station-vendor-based denial of an access request by—and perhaps among one or more other responses—not attempting to establish connectivity with any other base station that is operating on the same given frequency in the same given geographical area until the given mobile station detects a triggering event (such as the passage of a certain amount of time, the receipt of a suitable instruction from RAN 102, receipt of a user command, and/or one or more other possible triggering events).

IV. Conclusion

While some example embodiments have been described above, those of ordinary skill in the art will appreciate that numerous changes to the described embodiments could be made without departing from the scope and spirit of the claims.

We claim:

1. A method carried out by at least one radio access network (RAN) entity, the at least one RAN entity comprising at least one communication interface, at least one processor, and data storage containing program instructions executable by the at least one processor for carrying out the method, which comprises:
   receiving an access request from a given mobile station via a given base station;
   in response to receiving the access request,
      (i) determining an identity of a vendor of the given base station;
      (ii) based on the identity of the vendor, determining at least one location associated with the vendor of the given base station; and
      (iii) denying the access request based at least in part on the determined at least one location associated with the vendor of the given base station.

2. The method of claim 1, wherein the at least one RAN entity comprises at least one of a base station controller (BSC), a mobile switching center (MSC), a home location register (HLR), a visitor location register (VLR), a RAN controller, and a packet data serving node (PDSN).

3. The method of claim 1, wherein the access request comprises at least one of a registration request and a call-origination message.

4. The method of claim 1, wherein determining the identity of the vendor of the given base station comprises determining vendor-characteristic data that represents one or more characteristics of the vendor of the given base station.

5. The method of claim 4, wherein the vendor-characteristic data comprises at least one hardware identifier.

6. The method of claim 5, wherein the at least one hardware identifier comprises at least one of a media access control (MAC) address and a serial number.

7. The method of claim 4, wherein the vendor-characteristic data comprises at least one of a network address, a vendor identification number, and a vendor name.

8. The method of claim 4, wherein determining the identity of the vendor of the given base station further comprises referencing correlation data to map the determined vendor-characteristic data of the given base station to an identification of the vendor.

9. The method of claim 8, wherein the correlation data is stored local to the at least one RAN entity.

10. The method of claim 8, wherein the correlation data is stored remote from the at least one RAN entity.

11. The method of claim 4, wherein the access request comprises the vendor-characteristic data.

12. The method of claim 11, further comprising the given mobile station inserting the vendor-characteristic data into the access request.

13. The method of claim 11, further comprising the given base station inserting the vendor-characteristic data into the access request.

14. The method of claim 1, wherein the given base station is used by a wireless-service provider that operates the RAN, and is also used by at least one additional wireless-service provider.

15. The method of claim 1, wherein denying the access request comprises sending to the given mobile station an access-request-denying message.

16. The method of claim 1, further comprising:
   adding the vendor to a blacklist of vendors.

17. The method of claim 1, carried out in response to a determination that the vendor of the given base station is not listed on either a whitelist of vendors or a blacklist of vendors.

18. The method of claim 1, wherein the given base station operates on a given frequency in a given geographical area, the method further comprising the given mobile station responding to the denial of the access request at least in part by not attempting to establish connectivity with any other base station that is operating on the same given frequency in the same given geographical area until the given mobile station detects a triggering event.

19. The method of claim 1, wherein the determined at least one location associated with the vendor of the given base station includes a location of a headquarters of the vendor, and wherein denying the access request based at least in part on the determined at least one location associated with the vendor of the given base station comprises denying the access request based at least in part on the determined location of a headquarters of the vendor.

20. The method of claim 1, wherein the determined at least one location associated with the vendor of the given base station includes a location of a facility of the vendor, and wherein denying the access request based at least in part on the determined at least one location associated with the vendor of the given base station comprises denying the access request based at least in part on the determined location of a facility of the vendor.

21. The method of claim 1, wherein the determined at least one location associated with the vendor of the given base station includes a location of incorporation of the vendor, and wherein denying the access request based at least in part on the determined at least one location associated with the vendor of the given base station comprises denying the access request based at least in part on the determined location of incorporation of the vendor.

22. A radio access network (RAN) comprising:
   at least one communication interface;
   at least one processor; and
   data storage containing program instructions executable by the at least one processor for carrying out a set of functions, the set of functions comprising:

receiving an access request from a given mobile station via a given base station;

in response to receiving the access request,
    (i) determining an identity of a vendor of the given base station;
    (ii) based on the identity of the vendor, determining at least one location associated with the vendor of the given base station; and
    (iii) denying the access request based at least in part on the determined at least one location associated with the vendor of the given base station.

23. The RAN of claim 22, wherein determining the identity of the vendor of the given base station comprises:

determining vendor-characteristic data that represents one or more characteristics of the vendor of the given base station; and referencing correlation data to map the determined vendor-characteristic data of the given base station to an identification of the vendor.

24. The RAN of claim 22, wherein the given base station operates on a given frequency in a given geographical area, and wherein the given mobile station responds to the denial of the access request at least in part by not attempting to establish connectivity with any other base station that is operating on the same given frequency in the same given geographical area until the given mobile station detects a triggering event.

\* \* \* \* \*